(12) United States Patent
Park et al.

(10) Patent No.: US 11,600,818 B2
(45) Date of Patent: *Mar. 7, 2023

(54) PRELITHIATED AND METHODS FOR PRELITHIATING AN ENERGY STORAGE DEVICE

(71) Applicant: Enevate Corporation, Irvine, CA (US)

(72) Inventors: Benjamin Yong Park, Mission Viejo, CA (US); Frederic Bonhomme, Irvine, CA (US); Shiang Jen Teng, Irvine, CA (US); Victor E. House, Irvine, CA (US)

(73) Assignee: ENEVATE CORPORATION, Irvine, CA (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/095,330

(22) Filed: Nov. 11, 2020

(65) Prior Publication Data

US 2021/0075008 A1    Mar. 11, 2021

Related U.S. Application Data

(63) Continuation of application No. 16/213,826, filed on Dec. 7, 2018, now Pat. No. 10,847,792.

(Continued)

(51) Int. Cl.
*H01M 4/38* (2006.01)
*H01M 4/36* (2006.01)
(Continued)

(52) U.S. Cl.
CPC ......... *H01M 4/386* (2013.01); *H01M 4/0445* (2013.01); *H01M 4/364* (2013.01);
(Continued)

(58) Field of Classification Search
None
See application file for complete search history.

(56) References Cited

U.S. PATENT DOCUMENTS

| | | | |
|---|---|---|---|
| 5,556,721 A * | 9/1996 | Sasaki | H01M 4/386 |
| | | | 429/231.95 |
| 2006/0093916 A1 * | 5/2006 | Howard | H01M 4/362 |
| | | | 429/231.95 |

(Continued)

OTHER PUBLICATIONS

Y.-M. Lin, K.C. Klavetter, P.R. Abel, N.C. Davy, J.L. Snider, A. Heller, C.B. Mullins. High performance silicon nanoparticle anode in fluoroethylene carbonate-based electrolyte for Li-ion batteries, Chem. Commun., 2012, 48, 7268-7270.*

*Primary Examiner* — Carlos Barcena
(74) *Attorney, Agent, or Firm* — McAndrews, Held & Malloy, Ltd.

(57) ABSTRACT

The present disclosure relates to prelithiated Si electrodes, methods of prelithiating Si electrodes, and use of prelithiated electrodes in electrochemical devices are described. There are several characteristics of electrode prelithiation that enable the superior battery performance. First, a prelithiated silicon anode is already in its expanded state during SEI formation, and therefore less of the SEI layer breaks down and reforms during cycling. Second, the prelithiated anode has a lower anode potential, which may also help the cycle performance of an electrochemical device.

23 Claims, 6 Drawing Sheets

Related U.S. Application Data

(60) Provisional application No. 62/596,053, filed on Dec. 7, 2017.

(51) Int. Cl.
    *H01M 4/587*     (2010.01)
    *H01M 10/0525*     (2010.01)
    *H01M 10/0569*     (2010.01)
    *H01M 4/04*     (2006.01)
    *H01M 4/02*     (2006.01)
    *H01M 4/134*     (2010.01)

(52) U.S. Cl.
    CPC ....... *H01M 4/587* (2013.01); *H01M 10/0525* (2013.01); *H01M 10/0569* (2013.01); *H01M 4/134* (2013.01); *H01M 2004/027* (2013.01); *H01M 2300/0034* (2013.01)

(56) References Cited

U.S. PATENT DOCUMENTS

2007/0099084 A1*   5/2007  Huang ................... H01M 4/366
                                                        429/231.95
2016/0172711 A1*   6/2016  Yang .................... H01M 10/052
                                                          429/332

* cited by examiner

PRELITHIATED AND METHODS FOR PRELITHIATING AN ENERGY STORAGE DEVICE

PRIORITY CLAIM

This application is a Continuation of U.S. application Ser. No. 16/213,826 filed on Dec. 7, 2018, now U.S. Pat. No. 10,847,792, which claims the benefit of priority under 35 U.S.C. § 119(e) of U.S. Provisional Application No. 62/596,053 filed on Dec. 7, 2017. The entire disclosure of each of these priority documents is incorporated herein by reference.

BACKGROUND

Field

The present application relates generally to prelithiation of energy storage devices. In particular, the present application relates to prelithiation compositions and methods for use in lithium-ion energy storage devices with silicon-based anode materials.

Description of the Related Art

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes and accordingly prelithiated electrodes.

A lithium-ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

Si is one of the most promising anode materials for Li-ion batteries due to its high specific gravimetric and volumetric capacity (3579 mAh/g and 2194 mAh/cm$^3$ vs. 372 mAh/g and 719 mAh/cm$^3$ for graphite), and low lithiation potential (<0.4 V vs. Li/Li$^+$). Among the various cathodes presently available, layered lithium transition-metal oxides such as Ni-rich Li[Ni$_x$Co$_y$Mn(Al)$_{1-x-y}$]O$_2$ (NCM or NCA) are the most promising ones due to their high theoretical capacity (~280 mAh/g) and relatively high average operating potential (3.6 V vs Li/Li$^+$). Coupling Si anodes with high-voltage Ni rich NCM (or NCA) cathodes can deliver more energy than conventional Li-ion batteries with graphite-based anodes, due to the high capacity of these new electrodes. However, both Si-based anodes and high-voltage Ni rich NCM (or NCA) cathodes face formidable technological challenges, and long-term cycling stability with high-Si anodes paired with NCM or NCA cathodes has yet to be achieved.

Silicon as the electroactive negative electrode material is free of Li in its pristine form. During first charge, silicon reduces Li ions emanating from the cathodes and through the electrolyte resulting in an alloy of lithium and silicon. However, especially in the first charge and within subsequent cycles, organic solvent based electrolytes of batteries are unstable and tend to decompose a portion of the Li content to form a solid electrolyte interphase (SEI). In addition, as the SEI layer is formed, a portion of the Li introduced into the silicon is irreversibly bound effectively removing it from cyclic operation. This phenomenon is called irreversible capacity loss and is typically 10~30% of the capacity for the silicon negative electrode first charge capacity. As a result of cycling, the Li losses gradually accumulate in the subsequent cycles and causes performance (capacity) fade. In order to make good use of Si anode// NCM or NCA cathode-based Li-ion battery systems, the aforementioned barriers need to be overcome.

SUMMARY

In some aspects, energy storage devices are provided. In some embodiments, the energy storage device includes a first electrode and a second electrode, wherein at least one of the first electrode and the second electrode is a Si-based electrode, and wherein the Si-based electrode comprises a prelithiated silicon active material. In some embodiments, the energy storage device includes a separator between the first electrode and the second electrode. In some embodiments, the energy storage device includes an electrolyte. In some embodiments, the prelithiated silicon active material includes a prelithiation level of above 0% to about 30%.

In some embodiments, the prelithiated silicon active material comprises a prelithiation level of about 5%. In some embodiments, the prelithiated silicon active material comprises a prelithiation level of about 10%. In some embodiments, the prelithiated silicon active material comprises a prelithiation level of about 15%. In some embodiments, the prelithiated silicon active material comprises a prelithiation level of about 20%. In some embodiments, the prelithiated silicon active material comprises a prelithiation level of about 30%. In some embodiments, the prelithiated silicon active material further comprises a solid electrolyte interphase (SEI). In some embodiments, the prelithiated silicon active material is characterized by the formula Li$_x$Si, wherein x is a value that designates the lithiated silicon active material as in an amorphous phase.

In some embodiments, the second electrode is a Si-dominant electrode. In some embodiments, the second electrode comprises a self-supporting composite material film. In some embodiments, the composite material film comprises greater than 0% and less than about 90% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film.

In some embodiments, the electrolyte further comprises fluoroethylene carbonate (FEC). In some embodiments, the electrolyte is substantially free of non-fluorine containing cyclic carbonate.

In some aspects, electrodes are provided. In some embodiments, the electrode includes a delithiated silicon active material. In some embodiments, the delithiated silicon active material is characterized by the formula Li$_y$Si, wherein y is greater than 0.5 and less than 1.

In some embodiments, y is greater than 0.5 and less than 0.9. In some embodiments, y is greater than 0.5 and less than 0.8. In some embodiments, y is greater than 0.5 and less than 0.7. In some embodiments, y is greater than 0.5 and less than 0.6.

In some embodiments, the delithiated silicon active material further comprises a solid electrolyte interphase (SEI).

In some aspects, methods of prelithiating a silicon active material are described. In some embodiments, the method includes providing a silicon active material. In some embodiments, the method includes providing a lithium source. In some embodiments, the method includes prelithiating the silicon active material using the lithium source, thereby producing a prelithiated silicon active material. In some embodiments, the method includes wherein the prelithiated silicon active material comprises a prelithiation level of above 0% to about 30%.

In some embodiments, the lithium source comprises a sacrificial lithium source.

In some embodiments, the lithium source comprises a lithium metal source.

In some embodiments, the lithium source comprises an electrolyte additive comprising excess sacrificial lithium ions.

DETAILED DESCRIPTION

Figure 1:
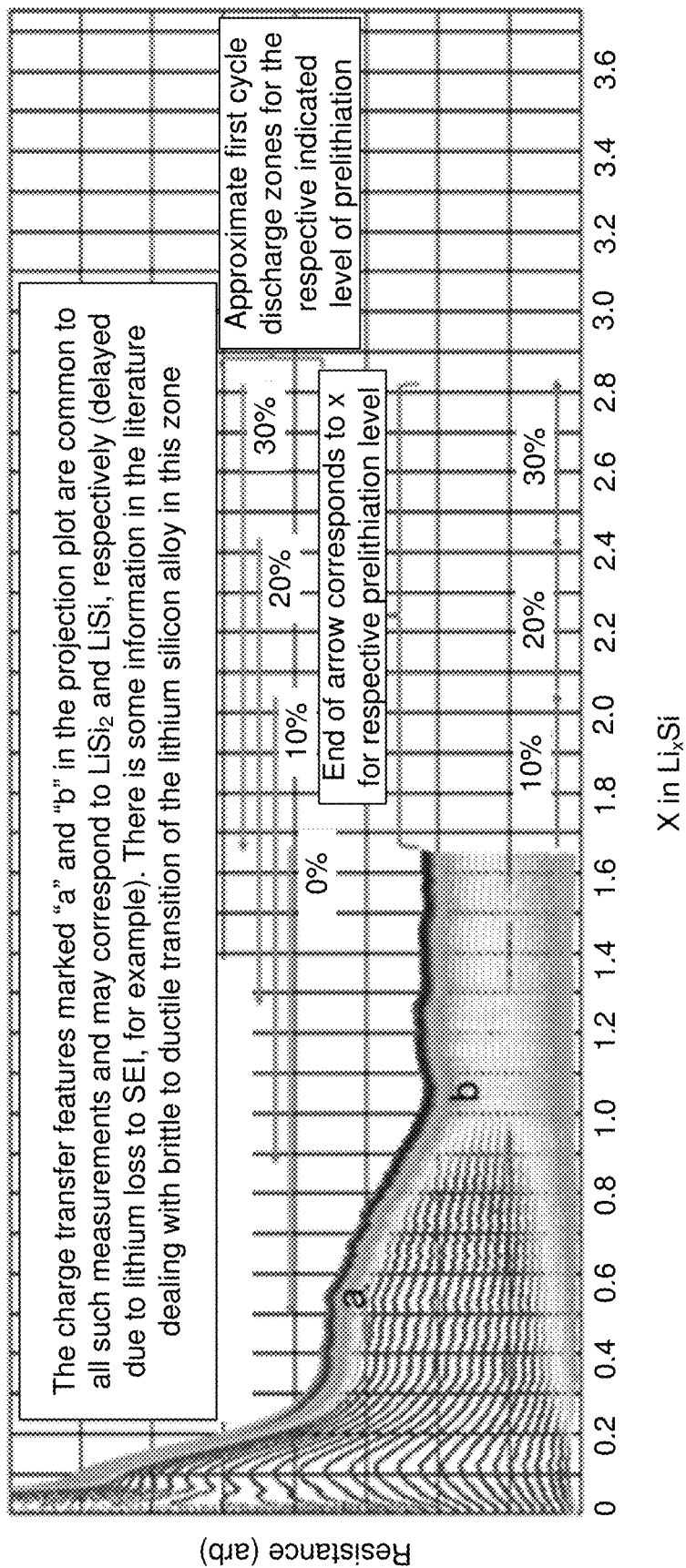
FIG. 1 depicts the projection into the complex plane of a Nyquist type EIS spectra dynamically gathered and presented as a function of x in $Li_xSi$.

To overcome the current obstacles associated with developing high-energy full-cells with Si-based anodes, prelithiated Si-based anodes and methods for prelithiating the Si-based anodes are developed.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

Cathode electrodes described herein may include metal oxide cathode materials, such as Lithium Cobalt Oxide ($LiCoO_2$) (LCO), Ni-rich oxides, high voltage cathode materials, lithium rich oxides, nickel-rich layered oxides, lithium rich layered oxides, high-voltage spinel oxides, and high-voltage polyanionic compounds. Ni-rich oxides and/or high voltage cathode materials may include NCM and NCA. One example NCM material includes $LiNi_{0.6}Co_{0.2}Mn_{0.2}O_2$ (NCM-622). Lithium rich oxides may include $xLi_2Mn_3 \cdot (1-x)LiNi_aCo_bMn_cO_2$. Nickel-rich layered oxides may include $LiNi_{1+x}M_{1-x}O_z$ (where M=Co, Mn or Al). Lithium rich layered oxides may include $LiNi_{1+x}M_{1-x}O_2$ (where M=Co, Mn or Ni). High-voltage spinel oxides may include $LiNi_{0.5}Mn_{1.5}O_4$. High-voltage polyanionic compounds may include phosphates, sulfates, silicates, etc.

As described herein and in U.S. patent application Ser. Nos. 13/008,800 and 13/601,976, entitled "Composite Materials for Electrochemical Storage" and "Silicon Particles for Battery Electrodes," respectively, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, a largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. The amount of silicon in the composite material can be greater than zero percent by weight of the mixture and composite material. In certain embodiments, the mixture comprises an amount of silicon, the amount being within a range of from about 0% to about 90% by weight, including from about 30% to about 80% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

The composite material can be formed by pyrolyzing a polymer precursor, such as polyamide acid. The amount of carbon obtained from the precursor can be about 50 weight percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material has a value within a range of from about 10% to about 25% by weight, about 20% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, a largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during use of the battery to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

An electrolyte for a lithium ion battery can include a solvent and a lithium ion source, such as a lithium-containing salt. The composition of the electrolyte may be selected to provide a lithium ion battery with improved performance. In some embodiments, the electrolyte may contain an electrolyte additive. As described herein, a lithium ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively.

In some embodiments, the electrolyte for a lithium ion battery may include a solvent comprising a fluorine-containing component, such as a fluorine-containing cyclic carbonate, a fluorine-containing linear carbonate, and/or a fluoroether. In some embodiments, the electrolyte can include more than one solvent. For example, the electrolyte may include two or more co-solvents. In some embodiments, at least one of the co-solvents in the electrolyte is a fluorine-containing compound. In some embodiments, the fluorine-containing compound may be fluoroethylene carbonate (FEC), 1,1,2,2-tetrafluoroethyl 2,2,3,3-tetrafluoropropyl ether, or difluoroethylene carbonate (F2EC). In some embodiments, the co-solvent may be selected from the group consisting of FEC, ethyl methyl carbonate (EMC), 1,1,2,2-tetrafluoroethyl 2,2,3,3-tetrafluoropropyl ether, difluoroethylene carbonate (F2EC), ethylene carbonate (EC), diethyl carbonate (DEC), dimethyl carbonate (DMC), propylene carbonate (PC), and gamma-Butyrolactone (GBL). In some embodiments, the electrolyte contains FEC. In some embodiments, the electrolyte contains both EMC and FEC. In some embodiments, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some embodiments, the electrolyte is free or substantially free of non-fluorine-containing cyclic carbonates, such as EC, GBL, and PC.

As used herein, a co-solvent of an electrolyte has a concentration of at least about 10% by volume (vol %). In some embodiments, a co-solvent of the electrolyte may be about 20 vol %, about 40 vol %, about 60 vol %, or about 80 vol %, or about 90 vol % of the electrolyte. In some embodiments, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %.

For example, in some embodiments, the electrolyte may contain a fluorine-containing cyclic carbonate, such as FEC, at a concentration of about 10 vol % to about 60 vol %, including from about 20 vol % to about 50 vol %, and from about 20 vol % to about 40 vol %. In some embodiments, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. In some embodiments, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %.

In some embodiments, the electrolyte is substantially free of cyclic carbonates other than fluorine-containing cyclic carbonates (i.e., non-fluorine-containing cyclic carbonates). Examples of non-fluorine-containing carbonates include EC, PC, GBL, and vinylene carbonate (VC).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from from about 1 wt % to about 9 wt %, from about 1 wt % to about 8 wt %, from about 1 wt % to about 7 wt %, from about 2 wt % to about 7 wt %, or any value in between.

Prelithiation

Silicon based batteries are typically produced having a negative electrode's silicon content void of any lithium content and that original silicon content is in the crystalline state. Lithiation of silicon is typically accompanied by the creation of various compositional phases of both crystalline and amorphous structure within the bulk of the lithiating silicon content. In general, crystalline structures are thermodynamically preferred in compositional regions suitable for crystalline structure formation, but amorphous structures can be persistently metastable to crystal formation when lithiation is carried-out via electrochemical means (meaning lithiation begins with a simultaneous acceptance of an electron from the silicon (alloy) surface and entry of the lithium atom into the solid alloy structure). This is opposed to physical lithiation which occurs through the diffusion of lithium atoms across a silicon/lithium solid/solid boundary with no electron exchange. In the case of electrochemical lithiation, the amount and rate of lithiation can be relatively and easily controlled through electronic means, while physical lithiation depends upon the conditions and arrangement of the solid silicon and lithium structure. Lithiation in this latter case cannot be easily controlled, as the rates and level of lithiation are dependent upon numerous variables whose mode of action towards lithiation rates and resulting structural contents are effectively unpredictable in combination.

Crystalline structures are generally more brittle than amorphous structures with amorphous structures exhibiting a greater degree of ductility. In part, this is due to the relative bond strengths between species that make-up the respective crystalline or amorphous phases as amorphous bonding can tend to be weaker and more "stretchable" (ductile). In the case of lithiation of silicon, with the knowledge that silicon in its virgin state is crystalline, as lithiation proceeds a transition between the crystalline and amorphous states relative to certain stoichiometries as given by LiSi is theorized. Without being bound to theory, it is believed that there is a crystalline to amorphous transition beginning at $Li_{0.5}Si$ (equivalent to $LiSi_2$) with a full amorphous alloy forming possible at LiSi.

The present disclosure has determined, in situ, the phase structure of a lithiating silicon based negative electrode and correlates the cycling performance of a prelithiated silicon based negative electrode structures to the phase regions of operation. Optimal values of x in LiSi that achieves optimal cycling performance relative to the span of utilization of the silicon electrode has been determined. Furthermore, a silicon based electrode in terms of its optimal prelithiation level has been determined.

Typically, first discharge of a newly lithiated silicon containing electrode will result in an apparent loss of lithium in that the lithium content added on first lithiation is not entirely recovered on removal. The termination of the arrows pointing leftwards in FIG. 1 align with typical values of x in LiSi for the first delithiated state of silicon in the electrode. Again surprisingly, points labeled "a" and "b" roughly correspond respectively to $Li_{0.5}Si$ and LiSi, the crystalline to amorphous transition zone explained above.

Novel utilization of electrochemical impedance spectroscopy (EIS) provides a window into in-situ identification of the phase nature of a lithiating silicon electrode. Furthermore, EIS may provide a means of identifying optimal values of x in LiSi for ranges of electrode utilization of a freshly conditioned (pre-lithiated) silicone dominant negative electrode before its first practical use. When an electrode is subjected to a constant current lithiation while simultaneously applying a relatively small varying sinusoidal sweep excitation current, a resulting and typical angular-phase shift of the corresponding sinusoidal response voltage occurs. This phase shift can be analyzed in terms of complex numbers having both a real and imaginary part. As measured at each sweep frequency, if the corresponding real and imaginary parts are plotted against one-another on a Cartesian plane, a Nyquist type curve results. Further, if the sweep excitation is continuously repeated as lithiation progresses, the resulting Nyquist curves can be "stacked" and plotted in 3 dimensions as a function of the charge time coordinate. Rotation of this 3 dimensional representation and projection of imaginary parts into the real part plane results in a specific and characteristic diagram for silicon depicted as a scatter plot. Since current and time are typically measured during lithiation, the amounts of silicon in a lithiating electrode and the theoretical limits of silicon lithiation of $Li_{3.75}Si$ is known. Therefore, the projection can be plotted as a function of the relative $Li_xSi$ stoichiometry in relation to full lithiation as an expansion of the x axis.

FIG. 1 depicts such a projection into the complex plane of a Nyquist type EIS spectra dynamically gathered and presented as a function of x in $Li_xSi$ with the x axis expanded in terms of the maximum theoretical capacity of fully lithiated silicon ($Li_{3.75}Si$). The plot of FIG. 1 is a typically measured projection into the imaginary plane of the real impedance of a cell slow-charged via constant current scanning EIS. The x-axis is the corresponding value of x in for the stoichiometry $Li_xSi$ of lithium alloying with silicon. The extension of the x axis is to 3.75, the generally accepted value for maximum lithium content in the alloy. Y axis is in arbitrary units of resistance (ohms). A typical silicon electrode lithiation EIS projection plot contains various features. Of particular note are features on the blue line of the scatter plot in FIG. 1. This line corresponds to a measure of charge transfer impedance on the surface of lithiating silicon as a lithium ion enters the silicon structure upon receipt of an electron. The blue line contains general features characteristic of all such plots generated as a result of measurements on any silicon based lithiating electrode. Surprisingly, these general features are in the form of first and second order phase transitions. Of the many examples of such transitions apparent in the scatter plot, the points labeled "a" and "b" are identified as charge transfer features, and roughly correspond to x values of 0.5 and 1, respectively, and are shifted to slightly higher values due to inefficiencies that are known to exist during silicon first-lithiation. The scatter plot contained in FIG. 1 represents EIS data collected over the course of a typical silicon based electrode's first charge half-cycle. In this case, the electrode was lithiated over the course of about 52 hours, thus the lithium distribution is very nearly homogeneous within silicon particles as referenced on the x axis of the scatter plot above. Also present in FIG. 1 are a series of arrows pointing to the right side of the graph with respective arrow terminations aligning with the value of x in $Li_xSi$ corresponding to the indicated total prelithiation percentage content.

As can be seen in FIG. 1, the leftward pointing arrow's termination correspond to three relative states of the first discharge of the silicon electrode: 1) 0% prelithiation with corresponding x in $Li_xSi$ of value less than 0.5; 2) 10% prelithiation with corresponding x in $Li_xSi$ of value between 0.5 and 1; and 3) 10% and 20% prelithiation with corresponding x in $Li_xSi$ greater than 1.

Thus, FIG. 1 demonstrates that the optimal cycling performance occurs for prelithiation percentages that allow for significant utilization of the zone defined by boundaries at $Li_{0.5}Si$ and $LiSi$, but not exceeding a lower limit defined by $Li_{0.5}Si$.

There are several characteristics of the silicon anode prelithiation that enable the superior battery performance. First, a prelithiated silicon anode is already in its expanded state during the SEI formation, and therefore less of the SEI layer breaks down and reforms during cycling. Second, the prelithiated anode has a lower anode potential, which also helps the cycle performance of an electrochemical device.

Prelithiating a silicon dominated anode with 10~30% of its anode capacity may improve the lithium ion battery performance by achieving a higher first cycle columbic efficiency (CE), stabilizing the cycle performance with a slower capacity fade, and maintaining a high CE over the cycling. Quantifying the prelithiation amount required for silicon-dominant electrode may also be used to enhance battery performance. A cell utilizing prelithiation of silicon-dominant electrode may be designed to have optimal CE and favorable cycle retention. Furthermore, prelithiate silicon may be advantageous over graphite because silicon anode voltage may be engineered to a lower potential (<0.1V).

In this regard, prelithiated Si electrodes and methods of prelithiating Si electrodes are described. In some embodiments, the electrode comprises a prelithiated silicon active material. In some embodiments, the prelithiated silicon active material comprises a prelithiation level of above 0% to about 30%. In some embodiments, the prelithiated silicon active material comprises a prelithiation level of about 5%. In some embodiments, the prelithiated silicon active material comprises a prelithiation level of about 10%. In some embodiments, the prelithiated silicon active material comprises a prelithiation level of about 15%. In some embodiments, the prelithiated silicon active material comprises a prelithiation level of about 20%. In some embodiments, the prelithiated silicon active material comprises a prelithiation level of about 30%. In some embodiments, the prelithiated silicon active material further comprises an SEI layer.

In some embodiments, a lithium ion battery comprising a silicon dominated anode is described. In some embodiments, the battery comprises a cathode. In some embodiments, the battery comprises a separator between the anode and the cathode. In some embodiments, the battery comprises an electrolyte that comprises lithium ions. In other embodiments, the silicon dominated anode is prelithiated with 10~30% of its anode capacity via either electrochemical prelithiation method or sacrificial lithium additive approaches before the first formation cycle.

In some embodiments, a silicon dominant electrode is prelithiated such that that the first discharge utilization zone results in a delithiated alloy designated by $Li_xSi$. In some embodiments, x is greater than 0.5 and less than 1. In some embodiments, x is greater than 0.5 and less than 0.9. In some embodiments, x is greater than 0.5 and less than 0.8. In some embodiments, x is greater than 0.5 and less than 0.7. In some embodiments, x is greater than 0.5 and less than 0.6. In some embodiments, x is 0.5. In some embodiments, x is 0.6. In some embodiments, x is 0.7. In some embodiments, x is 0.8. In some embodiments, x is 0.9. In some embodiments, x is 1.0.

In some embodiments, a silicon dominant electrode is prelithiated such that that the prelithiated alloy is designated by $Li_xSi$ with an initial x value. In some embodiments, the initial x value in $Li_xSi$ designates a silicon material of amorphous phase. In some embodiments, the initial x value in $Li_xSi$ is selected to be between two charge transfer features as determined by a galvanic scanning EIS methodology.

In some embodiments, a method of prelithiating a silicon active material is described. In some embodiments, the method comprises providing a silicon active material. In some embodiments, the method further comprises providing a lithium source. In some embodiments, the method further comprises prelithiating the silicon active material using the lithium source, thereby producing a prelithiated silicon active material. In some embodiments, the method comprises wherein the prelithiated silicon active material comprises a prelithiation level. In some embodiments, the prelithiation level is above 0% to about 30%. In some embodiments, the prelithiation level is about 5%. In some embodiments, the prelithiation level is about 10%. In some embodiments, the prelithiation level is about 15%. In some embodiments, the prelithiation level is about 20%. In some embodiments, the prelithiation level is about 30%.

In some embodiments, the prelithiated silicon active material is characterized by the formula $Li_xSi$. In some embodiments, the x value designates the lithiated silicon active material as in an amorphous phase. In some embodiments, the method further comprises a first discharge of the prelithiated silicon active material. In some embodiments, the first discharge of the prelithiated silicon active material produces a delithiated silicon active material.

In some embodiments, the delithiated silicon active material is characterized by the formula $Li_ySi$. In some embodiments, the y value is greater than 0.5 and less than 1. In some embodiments, the y value is greater than 0.5 and less than 0.9. In some embodiments, the y value is greater than 0.5 and less than 0.8. In some embodiments, the y value is greater than 0.5 and less than 0.7.

In some embodiments, a lithium source is used to prelithiate an electrode. In some embodiments, the lithium source is a sacrificial lithium source. In some embodiments, the sacrificial lithium source acts as a counter electrode to the silicon-bearing electrode during first lithiation. In some embodiments, the lithium source is a lithium metal. In some embodiments, the lithium metal acts as a source that contacts a lithium ion-bearing electrolyte and is simultaneously in contact with the silicon based electrode during first lithiation. In some embodiments, the lithium source is an electrolyte additive. In some embodiments, the electrolyte additive comprises an excess of sacrificial lithium content.

In some embodiments, a method of determining an ideal prelithiation level of a given silicon material is described. In some embodiments, the method comprises utilization of electrochemical impedance spectroscopy (EIS).

In some embodiments, the electrode comprises about 80% Si. In some embodiments, the electrode is a film based electrode. In some embodiments, the electrode is a Si dominant anode. In some embodiments, the electrode comprises graphite. In some embodiments, the electrode comprises glass carbon. In some embodiments, the electrode comprises Cu foil.

In some embodiments, an electrochemical device comprising the electrode is described. In some embodiments, the electrochemical device further comprises a cathode. In some embodiments, the cathode comprises an element selected from the group consisting of Li, Na, K, or mixtures thereof. In some embodiments, the cathode comprises Li. In some embodiments, the cathode comprises $LiCoO_2$. In some embodiments, the cathode comprises about 97 wt % $LiCoO_2$. In some embodiments, the cathode is a film based electrode. In some embodiments, the cathode is a layered NCM cathode. In some embodiments, the cathode comprises Super P. In some embodiments, the cathode comprises PVDF5130. In some embodiments, the cathode comprises Al foil.

In some embodiments, the electrochemical device comprises an electrolyte. In some embodiments, the electrolyte comprises FEC, EMC or HFDEC, or mixtures thereof. In some embodiments, the electrolyte comprises FEC or EMC, or mixtures thereof. In some embodiments, the electrolyte comprises greater than or equal to about 10 wt % FEC, EMC or HFDEC, or mixtures thereof. In some embodiments, the electrolyte comprises greater than or equal to about 10 wt % FEC or EMC, or mixtures thereof. In some embodiments, the electrolyte comprises about 3 wt % FEC, about 3.5 wt % HFDEC and about 3.5 wt % EMC. In some embodiments, the electrolyte comprises about 3 wt % FEC and about 7 wt % EMC. In some embodiments, the electrolyte does not comprise EC. In some embodiments, the electrolyte comprises $LiPF_6$. In some embodiments, the electrolyte comprises $LiPF_6$ at a concentration of about 1.2 M.

Energy Storage Device

The prelithiated anodes and prelithiation methods described herein may be advantageously utilized within an energy storage device. In some embodiments, energy storage devices may include batteries, capacitors, and battery-capacitor hybrids. In some embodiments, the energy storage device comprise lithium. In some embodiments, the energy storage device may comprise at least one electrode, such as an anode and/or cathode. In some embodiments, at least one electrode may be a Si-based electrode. In some embodiments, the Si-based electrode is a Si-dominant electrode, where silicon is the majority of the active material used in the electrode (e.g., greater than 50% silicon). In some embodiments, the energy storage device comprises a separator. In some embodiments, the separator is between a first electrode and a second electrode.

In some embodiments, the energy storage device comprises a prelithiated anode, as described previously herein.

Pouch Cell

Figure 2:
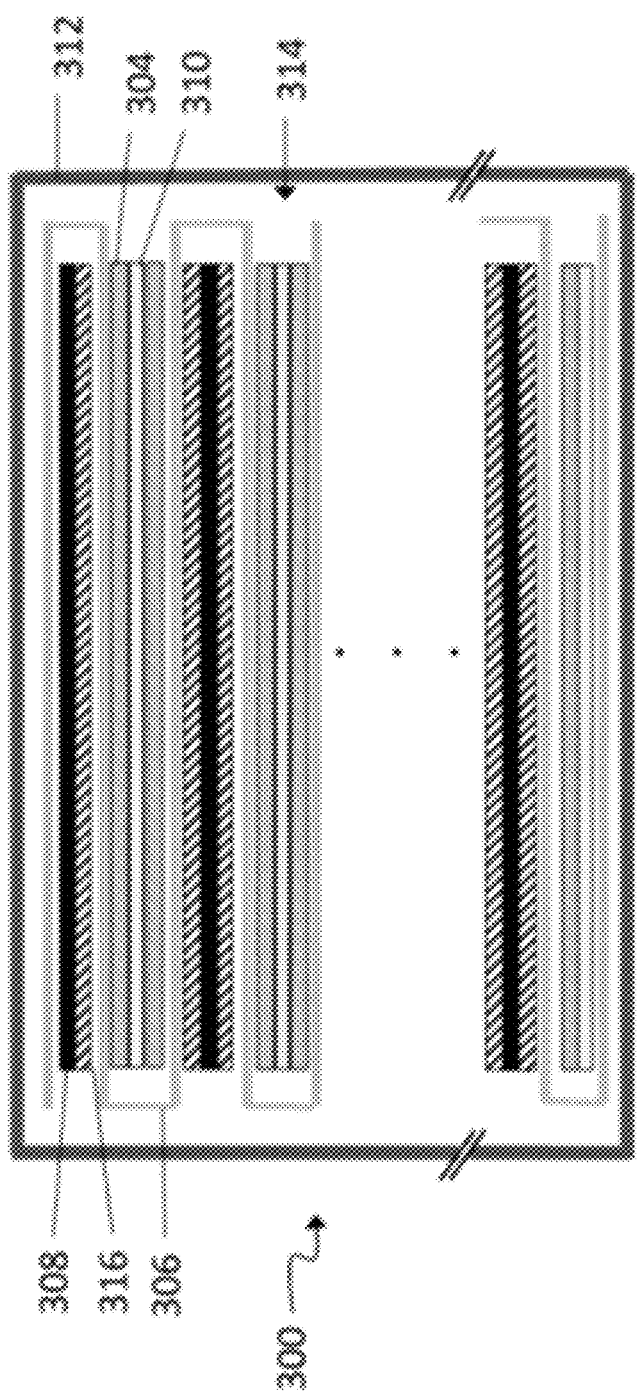
FIG. 2 depicts a cross-sectional schematic diagram of an example of a lithium-ion battery 300 implemented as a pouch cell.

As described herein, a battery can be implement as a pouch cell. FIG. 2 shows a cross-sectional schematic diagram of an example of a lithium ion battery 300 implemented as a pouch cell, according to some embodiments. The battery 300 comprises an anode 316 in contact with a negative current collector 308, a cathode 304 in contact with a positive current collector 310, a separator 306 disposed between the anode 316 and the cathode 304. In some embodiments, a plurality of anodes 316 and cathodes 304 may be arranged into a stacked configuration with a separator 306 separating each anode 316 and cathode 304. Each negative current collector 308 may have one anode 316 attached to each side; each positive current collector 310 may have one cathode 304 attached to each side. The stacks are immersed in an electrolyte 314 and enclosed in a pouch 312. The anode 302 and the cathode 304 may comprise one or more respective electrode films formed thereon. The number of electrodes of the battery 300 may be selected to provide desired device performance.

With further reference to FIG. 2, the separator 306 may comprise a single continuous or substantially continuous sheet, which can be interleaved between adjacent electrodes of the electrode stack. For example, the separator 306 may be shaped and/or dimensioned such that it can be positioned between adjacent electrodes in the electrode stack to provide desired separation between the adjacent electrodes of the battery 300. The separator 306 may be configured to facilitate electrical insulation between the anode 302 and the cathode 304, while permitting ionic transport between the anode 302 and the cathode 304. In some embodiments, the separator 306 may comprise a porous material, including a porous polyolefin material.

The lithium ion battery 300 may include an electrolyte 314, for example an electrolyte having a composition as described herein. The electrolyte 314 is in contact with the anode 302, the cathode 304, and the separator 306.

With continued reference to FIG. 2, the anode 302, cathode 304 and separator 306 of the lithium ion battery 300 may be enclosed in a housing comprising a pouch 312. In some embodiments, the pouch 312 may comprise a flexible material. For example, the pouch 312 may readily deform upon application of pressure on the pouch 312, including pressure exerted upon the pouch 312 from within the housing. In some embodiments, the pouch 312 may comprise aluminum. For example, the pouch 312 may comprise a laminated aluminum pouch.

In some embodiments, the lithium ion battery 300 may comprise an anode connector (not shown) and a cathode connector (not shown) configured to electrically couple the anodes and the cathodes of the electrode stack to an external circuit, respectively. The anode connector and a cathode connector may be affixed to the pouch 312 to facilitate electrical coupling of the battery 300 to an external circuit. The anode connector and the cathode connector may be affixed to the pouch 312 along one edge of the pouch 312. The anode connector and the cathode connector can be electrically insulated from one another, and from the pouch 312. For example, at least a portion of each of the anode connector and the cathode connector can be within an electrically insulating sleeve such that the connectors can be electrically insulated from one another and from the pouch 312.

Examples

The batteries shown in FIGS. 3-6 comprise a Si-dominant anode and a $LiCoO_2$ cathode. The Si-dominant anodes contain about 80 wt % Si, 5 wt % graphite and 15 wt % glass carbon (from resin), and are laminated on 15 μm Cu foil. The average loading is about 3.8 mg/cm². The cathodes contain about 97 wt % $LiCoO_2$, 1 wt % Super P and 2 wt % PVDF5130, and are laminated on 15 μm Al foil. The average loading is about 28 mg/cm². The electrolytes of the cells contain 1M $LiPF_6$ in FEC/EMC (3/7 wt %). The electrochemical tests were carried out at 0.5 C/0.5 C charge/discharge processes with the working voltage window of 3.3V-4.3V.

Example 1: First Cycle Coulombic Efficiency

Figure 3:
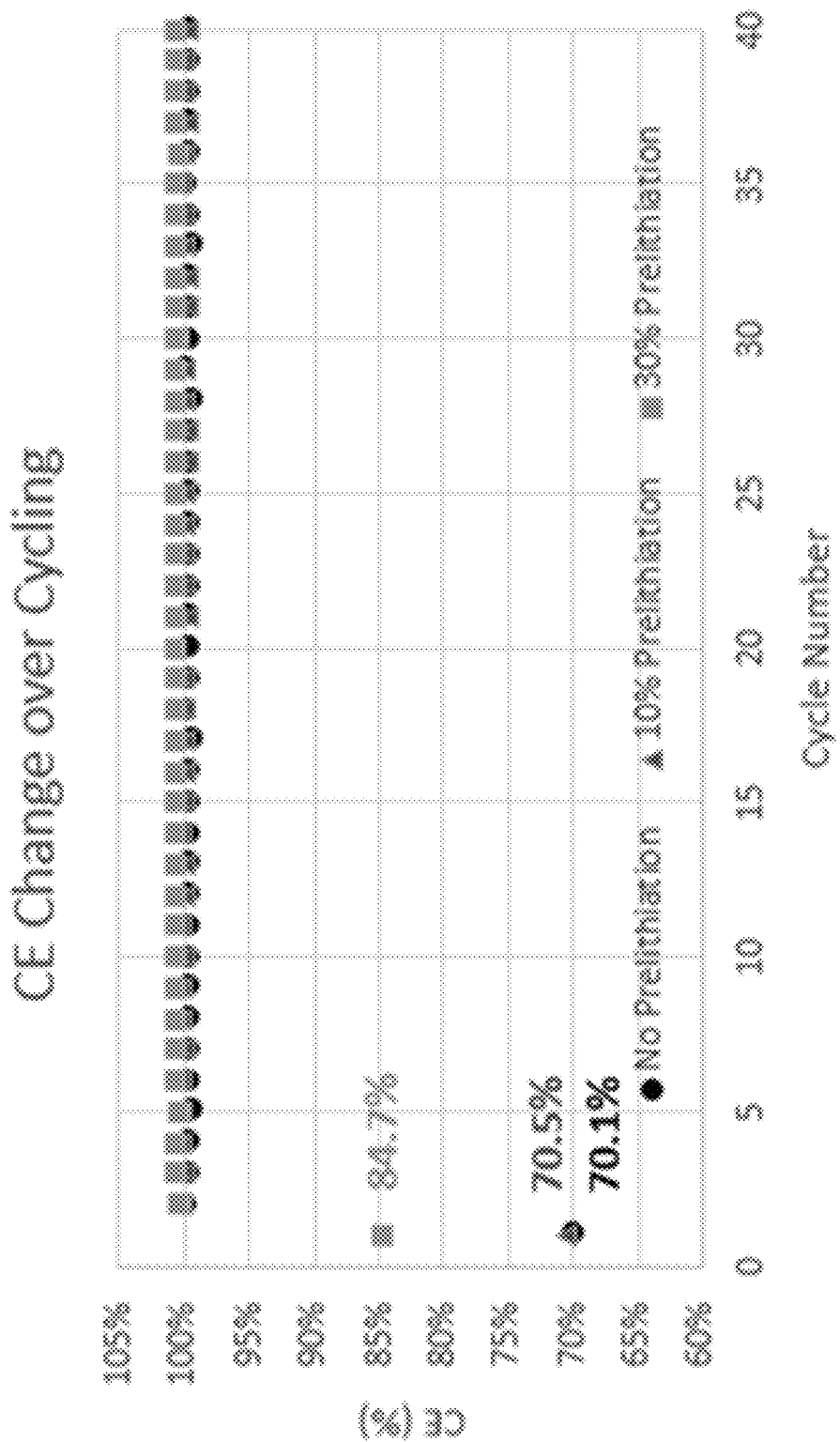
FIG. 3 shows the change of first cycle coulombic efficiencies of embodiments of Si-dominant anode/$LiCoO_2$ full cells with varying levels of prelithiation.

FIG. 3 demonstrates the effects of prelithiation of a silicon dominated anode has on the change of first cycle coulombic efficiency (CE) over cycles in full cell format. The first cycle CE of the control device was 70.1% due to a large portion of Li required for the SEI formation. Control devices were not able to achieve a perfect CE, and their CE's decreased from 99.9% to 99.7% within the initial 40 cycles.

In contrast, the first cycle capacity loss was less for the prelithiated anode cells. The first cycle CE was 70.5% for a device with a 10% prelithiated anode, and 84.7% for a device with a 30% prelithiated anode. In addition, the prelithiated silicon dominated anode cells were able to achieve a perfect cycle CE of >100%.

Example 2: Cycling Stability

Figure 4:
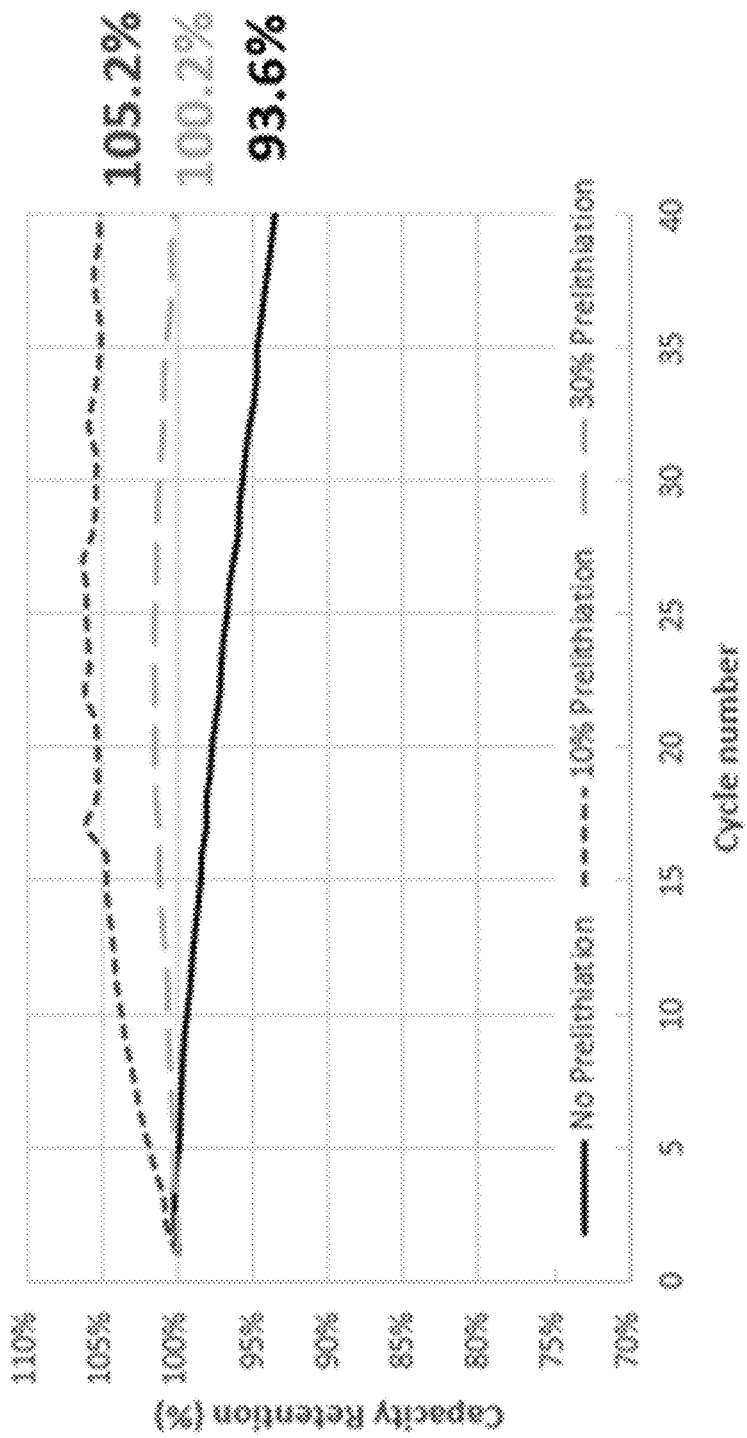
FIG. 4 shows the cycling stability when tested at C/20 for 40 cycles of embodiments of Si-dominant anode/$LiCoO_2$ full cells with varying levels of prelithiation.

FIG. 4 demonstrates the cycling stability of the prelithiated silicon dominated anodes when tested at C/20 for 40 cycles. The capacity retention after 40 cycles was 105.2% for a device with a 10% prelithiated anode, and 100.2% for a device with a 30% prelithiated anode. In contrast, the control device showed a steady capacity fade of 93.6% over 40 cycles.

Example 3: Cycling Performance

Figure 5:
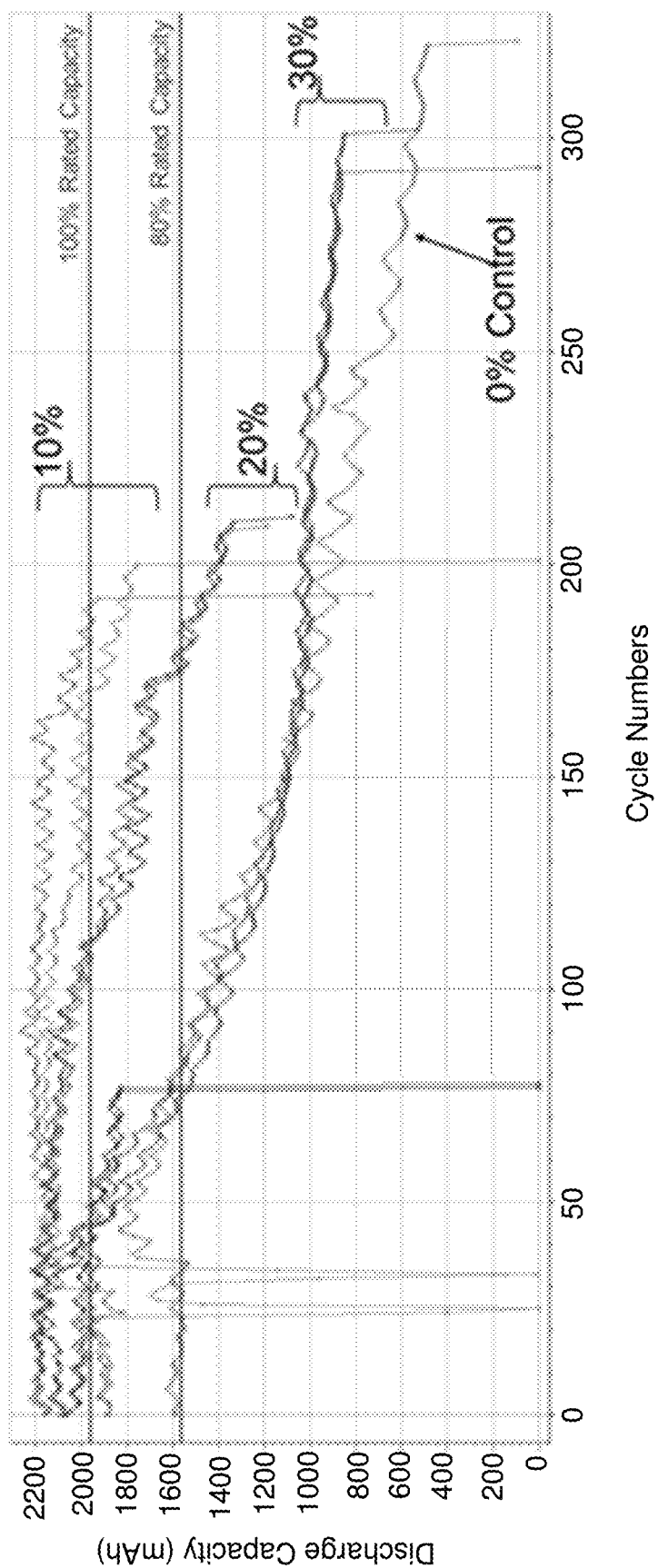
FIG. 5 shows the cycling performance of embodiments of Si-dominant anode/$LiCoO_2$ full cells with varying levels of prelithiation.

FIG. 5 shows cycling performance of battery cells containing prelithiated silicon with 0%, 10%, 20% and 30% prelithiation. FIG. 5 demonstrates a marked improvement in cycling capacity of prelithiated structures when compared to controls, and points to a systemic method of determining the optimal prelithiation content.

Example 4: Cycling Improvement

Figure 6:
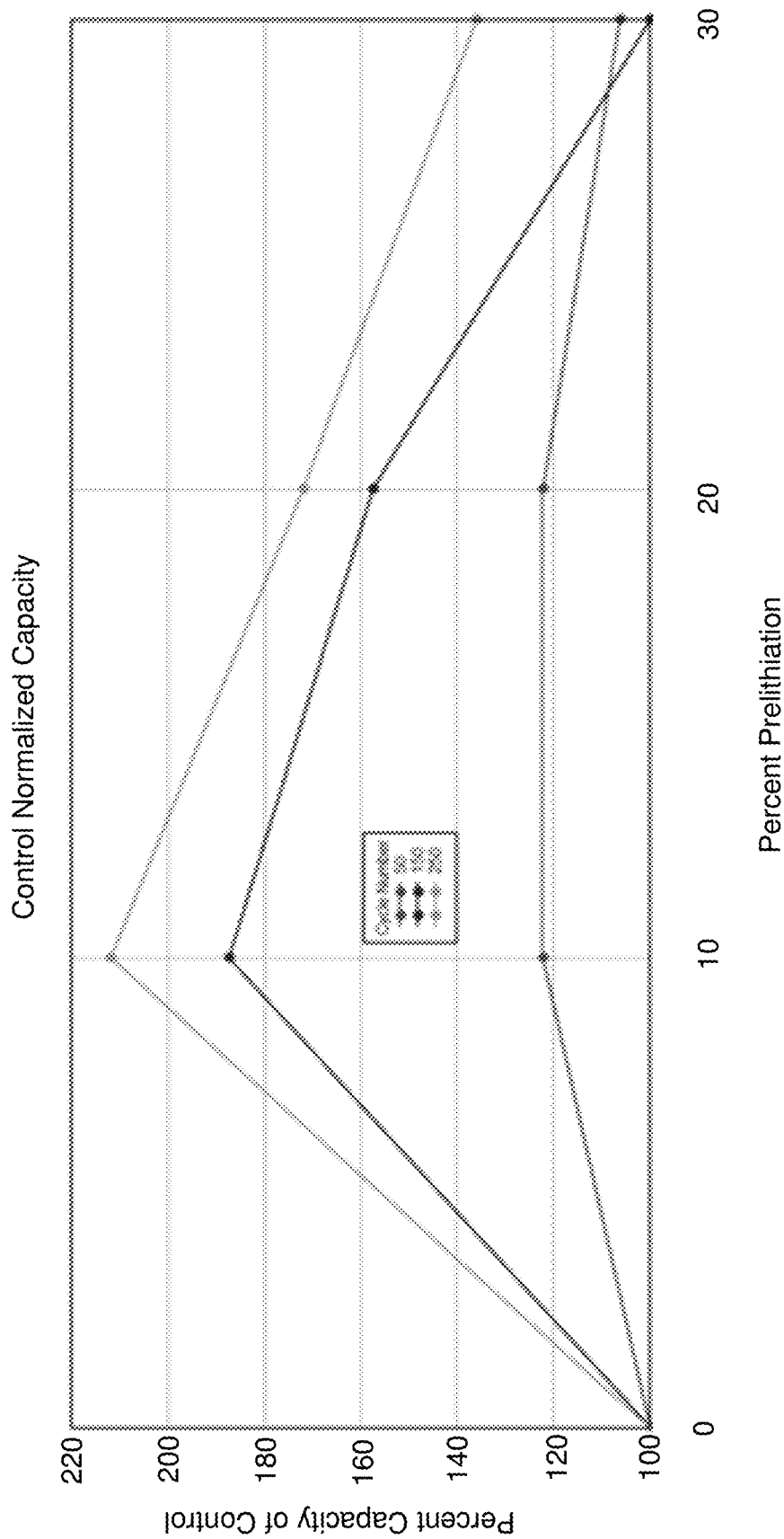
FIG. 6 shows the cycling improvement of embodiments of Si-dominant anode/$LiCoO_2$ full cells with varying levels of prelithiation.

FIG. 6 demonstrates the cycling improvement over control as a function of prelithiation percentage of negative silicon electrode with 0%, 10%, 20% and 30% prelithiation shown. As can be seen in FIG. 6, there appears to be an optimal level of prelithiation falling above 0% and below 20%.

FIGS. 3-6 demonstrate the superior and unexpected advantages prelithiation levels of above 0% and about 30% may have on silicon based anodes, such as the Si-dominate anodes shown.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An energy storage device comprising:
   a first electrode and a second electrode, wherein at least one of the first electrode and the second electrode is a Si-based electrode, and wherein the Si-based electrode comprises a prelithiated silicon active material;
   a separator between the first electrode and the second electrode; and
   an electrolyte;
   wherein the prelithiated silicon active material comprises a prelithiation level of above 0% to about 30% that corresponds to $Li_xSi$ with x ranging from 0.5 to 1.0, respectively, and the prelithiation is from a lithium additive in the electrolyte comprising more lithium ions than what is needed to prelithiate the active material to a level between 0% to about 30%.

2. The energy storage device of claim 1, wherein the prelithiated silicon active material comprises a prelithiation level of about 5%.

3. The energy storage device of claim 1, wherein the prelithiated silicon active material comprises a prelithiation level of about 10%.

4. The energy storage device of claim 1, wherein the prelithiated silicon active material comprises a prelithiation level of about 15%.

5. The energy storage device of claim 1, wherein the prelithiated silicon active material comprises a prelithiation level of about 20%.

6. The energy storage device of claim 1, wherein the prelithiated silicon active material comprises a prelithiation level of about 30%.

7. The energy storage device of claim 1, wherein the prelithiated silicon active material further comprises a solid electrolyte interphase (SEI).

8. The energy storage device of claim 1, wherein x is configured at a value above 0.5 where the lithiated silicon active material transitions from a crystalline phase to an amorphous phase.

9. The energy storage device of claim 1, wherein the second electrode is a Si-dominant electrode.

10. The energy storage device of claim 1, wherein the second electrode comprises a self-supporting composite material film.

11. The energy storage device of claim 10, wherein the composite material film comprises:
    greater than 0% and less than about 90% by weight of silicon particles, and
    greater than 0% and less than about 90% by weight of one or more types of carbon phases, wherein at least one of the one or more types of carbon phases is a substantially continuous phase that holds the composite material film together such that the silicon particles are distributed throughout the composite material film.

12. The energy storage device of claim 1, wherein the electrolyte further comprises fluoroethylene carbonate (FEC).

13. The energy storage device of claim 12, wherein the electrolyte is substantially free of non-fluorine containing cyclic carbonate.

14. An electrode comprising:
    a delithiated silicon active material;
    wherein the delithiated silicon active material is characterized by the formula $Li_ySi$, wherein y is greater than 0.5 and less than 1 and a prelithiation of the active material is from a lithium additive in the electrolyte comprising more lithium ions than what is needed to prelithiate the active material to a level between 0% to about 30%.

15. The electrode of claim 14, wherein y is greater than 0.5 and less than 0.9.

16. The electrode of claim 14, wherein y is greater than 0.5 and less than 0.8.

17. The electrode of claim 14, wherein y is greater than 0.5 and less than 0.7.

18. The electrode of claim 14, wherein y is greater than 0.5 and less than 0.6.

19. The electrode of claim 14, wherein the delithiated silicon active material further comprises a solid electrolyte interphase (SEI).

20. A method of prelithiating a silicon active material, comprising:
    providing a silicon active material;
    providing an electrolyte;
    providing a lithium source; and prelithiating the silicon active material using the lithium source, thereby producing a prelithiated silicon active material;

wherein the prelithiated silicon active material comprises a prelithiation level of above 0% to about 30% that corresponds to $Li_xSi$ with x ranging from 0.5 to 1.0, respectively, and the prelithiation is from a lithium additive in the electrolyte comprising more lithium ions than what is needed to prelithiate the active material to a level between 0% to about 30%.

21. The method of claim 20, wherein the lithium source comprises a sacrificial lithium source, the additive comprising less than 10% of the electrolyte.

22. The method of claim 20, wherein the lithium source comprises a lithium metal source.

23. The method of claim 20, wherein the electrolyte additive comprises less than 10% by weight of the electrolyte.

* * * * *